(12) United States Patent
Smith

(10) Patent No.: US 12,304,161 B2
(45) Date of Patent: May 20, 2025

(54) MANUFACTURE OF A WIND TURBINE COMPONENT

(71) Applicant: Vestas Wind Systems A/S, Aarhus N (DK)

(72) Inventor: Jonathan Smith, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 170 days.

(21) Appl. No.: 18/277,328

(22) PCT Filed: Feb. 15, 2022

(86) PCT No.: PCT/DK2022/050027
§ 371 (c)(1),
(2) Date: Aug. 15, 2023

(87) PCT Pub. No.: WO2022/174876
PCT Pub. Date: Aug. 25, 2022

(65) Prior Publication Data
US 2024/0123695 A1 Apr. 18, 2024

(30) Foreign Application Priority Data
Feb. 16, 2021 (DK) .......................... PA 2021 70070

(51) Int. Cl.
*B29C 70/48* (2006.01)
*B29C 35/02* (2006.01)
(Continued)

(52) U.S. Cl.
CPC ........ *B29C 70/443* (2013.01); *B29C 35/0288* (2013.01); *B29C 70/06* (2013.01);
(Continued)

(58) Field of Classification Search
CPC ... B29C 70/443; B29C 35/0288; B29C 70/06; B29C 70/48; B29C 70/462
See application file for complete search history.

(56) References Cited

U.S. PATENT DOCUMENTS 3,608,869 A * 9/1971 Woodle ................. B01F 35/833
366/132
3,802,605 A * 4/1974 Standlick .............. B29B 7/7642
222/134
(Continued)

FOREIGN PATENT DOCUMENTS

CN 107953575 A 4/2018
EP 2276808 A1 1/2011
(Continued)

OTHER PUBLICATIONS

International Searching Authority, International Search Report and WRitten Opinion issued in corresponding PCT Application No. PCT/DK2022/050027, dated May 16, 2022.
(Continued)

*Primary Examiner* — Matthew J Daniels
(74) *Attorney, Agent, or Firm* — Wood Herron & Evans LLP

(57) ABSTRACT

In a first aspect of the invention there is provided a method of making a wind turbine component, the method comprising supporting a layup (14) of fibrous reinforcing material in a mould (12); providing a supply of resin (16); providing a supply of hardener (20) comprising at least a first hardener (20*a*) and a second hardener (20*b*), the second hardener being faster than the first hardener; mixing resin with the first and/or second hardener to create a resin mixture (24); supplying the resin mixture (24) to the layup (14) during an infusion process; monitoring one or more process parameters of the infusion process; and controlling the speed of the hardener (20) by varying the relative proportions of the first
(Continued)

and second hardeners (20a, 20b) in the resin mixture (24) during the course of the infusion process in dependence upon the one or more process parameters.

18 Claims, 11 Drawing Sheets

(51) Int. Cl.
  B29C 70/06      (2006.01)
  B29C 70/36      (2006.01)
  B29C 70/44      (2006.01)
  B29C 70/54      (2006.01)
  B29C 70/68      (2006.01)
  B29K 63/00      (2006.01)
  B29K 105/08     (2006.01)
  B29K 309/08     (2006.01)
  B29L 31/08      (2006.01)

(52) U.S. Cl.
  CPC .............. *B29C 70/36* (2013.01); *B29C 70/54* (2013.01); *B29C 70/681* (2013.01); *B29K 2063/00* (2013.01); *B29K 2105/08* (2013.01); *B29K 2309/08* (2013.01); *B29L 2031/085* (2013.01)

(56) References Cited

U.S. PATENT DOCUMENTS

| | | | | |
|---|---|---|---|---|
| 4,108,335 A | * | 8/1978 | Hoff | B05B 12/1418 222/335 |
| 4,131,395 A | * | 12/1978 | Gusmer | F04B 53/164 417/426 |
| 4,279,360 A | * | 7/1981 | Hauser | B29C 31/06 222/63 |
| 4,312,594 A | * | 1/1982 | Woodle | B01F 35/50 366/267 |
| 4,366,918 A | * | 1/1983 | Naka | B01F 35/882 222/134 |
| 4,427,298 A | * | 1/1984 | Fahy | G05D 11/132 366/132 |
| 4,440,314 A | * | 4/1984 | Vetter | B01F 35/83 222/61 |
| 4,455,268 A | * | 6/1984 | Hinrichs | B29C 35/0288 264/494 |
| 4,628,861 A | * | 12/1986 | Mitchell | B05B 12/00 118/692 |
| 4,682,710 A | * | 7/1987 | Turner, Jr. | B05B 9/002 222/146.2 |
| 4,964,732 A | * | 10/1990 | Cadeo | B01F 35/833 366/159.1 |
| 5,187,001 A | * | 2/1993 | Brew | B29B 7/7471 425/557 |
| 2007/0145622 A1 | * | 6/2007 | Cicci | B29C 70/443 264/511 |
| 2009/0115112 A1 | * | 5/2009 | Liebmann | B29C 70/443 264/510 |
| 2011/0100541 A1 | * | 5/2011 | Shindo | B29C 70/548 156/500 |
| 2011/0130524 A1 | | 6/2011 | Wittenbecher et al. | |
| 2011/0180970 A1 | | 7/2011 | Wittenbecher et al. | |
| 2014/0333008 A1 | * | 11/2014 | Harboe | B29C 31/04 425/162 |
| 2017/0100894 A1 | | 4/2017 | Burns et al. | |
| 2018/0319046 A1 | | 11/2018 | Johnson et al. | |
| 2021/0101351 A1 | * | 4/2021 | Bland | B29C 70/06 |
| 2021/0308964 A1 | * | 10/2021 | Frahm | B29C 70/546 |
| 2021/0323253 A1 | * | 10/2021 | Lu | B32B 3/30 |

FOREIGN PATENT DOCUMENTS

| | | | | |
|---|---|---|---|---|
| KR | 20140039063 A | * | 3/2014 | .............. C09D 4/00 |
| WO | 2009003476 A1 | | 1/2009 | |
| WO | 2009138749 A1 | | 11/2009 | |
| WO | 2011137909 A1 | | 11/2011 | |
| WO | 2012026980 A2 | | 3/2012 | |
| WO | 2013072074 A1 | | 5/2013 | |
| WO | 2019122840 A2 | | 6/2019 | |

OTHER PUBLICATIONS

Danish Patent and Trademark Office, examination report issued in corresponding Danish Patent Application No. PA 2021 70070, dated Aug. 26, 2021.
HP-Textiles, Technical Data Sheet, Epoxy-System HP-E3000RI, XP002806282, Mar. 11, 2018, retrieved from Internet Apr. 22, 2022: https://www.hp-textiles.com/TDS/EN/Epoxy/infusion_Injection_Process_Resin_GTDS_RI.pdf.

* cited by examiner

MANUFACTURE OF A WIND TURBINE COMPONENT

TECHNICAL FIELD

The present invention relates generally to wind turbine components and more specifically to a method of manufacturing a wind turbine component.

BACKGROUND

Composite materials such as glass reinforced plastic (GFRP) are advantageous for use in wind turbine components, such as wind turbine blades, due to their mechanical properties such as their low mass and high strength. With reference to wind turbine blades, these may, for example, comprise an outer shell formed in a composite moulding process in which fibrous reinforcing material is infused with a resin mixture. The resin mixture is cured to produce a blade shell comprising reinforcing fibres fixed in a cured resin matrix. However, composite moulding processes, such as vacuum assisted resin transfer moulding (VARTM), can present a number of challenges, especially when manufacturing large wind turbine components such as wind turbine blades.

The resin mixture in a composite moulding process typically comprises resin and a hardener, which chemically react to cure the resin mixture. The resin mixture becomes more viscous, i.e. less fluid as it cures to a solid state. The viscosity of the resin mixture is influenced by the temperature and reactivity of the hardener in the resin mixture. However, as the resin mixture cures and becomes more viscous, the speed of infusion decreases, i.e. the resin mixture infuses the fibrous reinforcing material more slowly. Further, premature curing of the resin mixture could cause blockages which lead to an incomplete infusion with dry spots where the fibrous reinforcing material is not infused. As such, the hardener is typically selected to ensure that the resin mixture cures at a specific rate to ensure that the mixture remains sufficiently fluid, i.e. uncured, until the fibrous reinforcing material has been completely infused.

However, a resin mixture with a long cure time, by definition, also results in a long cycle time between starting the infusion and obtaining a fully cured wind turbine component. This can increase the risk of leaks occurring during the infusion and curing process, and may increase the risk of other defects. Further, extended cycle times increase the in-mould time (i.e. the time that a wind turbine component occupies the mould), thereby decreasing the throughput of the manufacturing facility. As such it is desirable to reduce infusion and curing cycle times.

It is against this background that the present invention has been developed.

SUMMARY OF INVENTION

In a first aspect of the invention there is provided a method of making a wind turbine component. The method comprises supporting a layup of fibrous reinforcing material in a mould and providing a supply of resin. The method further comprises providing a supply of hardener comprising at least a first hardener and a second hardener, the second hardener being faster than the first hardener, and mixing resin with the first and/or second hardener to create a resin mixture. The method further comprises supplying the resin mixture to the layup during an infusion process, monitoring one or more process parameters of the infusion process, and controlling the speed of the hardener by varying the relative proportions of the first and second hardeners in the resin mixture during the course of the infusion process in dependence upon the one or more process parameters.

The one or more process parameters may be selected from the group comprising: ambient temperature, resin mixture temperature, elapsed time since start of infusion process, position of the resin mixture flow front and a vacuum pressure in the mould.

The fibrous reinforcing material may comprise glass reinforcing fibres. The fibrous reinforcing material may be provided in the form of chopped strand mats. Preferably, the fibrous reinforcing material is provided in the form of fabric wherein the reinforcing fibres are arranged in a specific orientation. For example, the fibrous reinforcing material is preferably provided in the form of fabric comprising unidirectional reinforcing fibres or biaxial reinforcing fibres or triaxial reinforcing fibres.

The resin and hardener are preferably provided in a liquid state. Mixing the resin and the hardener to create the resin mixture initiates a chemical reaction that eventually causes the liquid resin mixture to cure. The time taken from creating the resin mixture to the resin mixture being fully cured is referred to as the cure time. The resin mixture remains in a substantially liquid, workable state in an initial portion of the total cure time, referred to as the "open time", or "working time" or "wet lay-up time" in some examples.

Once the open time elapses, the resin mixture enters an initial-cure phase, also referred to as a "green stage" or a "gel phase", in which the resin mixture has a much higher viscosity. In the gel phase the resin is no longer workable, i.e. the resin mixture does not flow and therefore does not infuse the layup further. Following the gel phase, the resin mixture continues to cure until it is reaches a fully cured, solid, state.

The cure time of the resin mixture is influenced at least partially by the speed of the hardener in the resin mixture. As such, the speed of the hardener, or hardener speed, as referred to herein refers to the rate at which, for a given temperature, a resin mixture comprising that hardener progresses through the curing phases, from liquid, to gel phase, to fully cured.

The method comprises controlling the speed of the hardener, i.e. varying relative proportions of the first (slower) and second (faster) hardeners in the resin mixture, to tailor the cure time of the resin mixture being infused into the layup in dependence upon one or more process parameters throughout the infusion process. The open time of the resin mixture is also influenced by the speed of the hardener in the resin mixture. The method therefore also comprises controlling the open time of the resin mixture, wherein the resin mixture is in a substantially liquid state, by controlling the speed of the hardener by varying the relative proportions of the first and second hardeners in the resin mixture.

Referring more specifically to the open time of the resin mixture, the first and second hardeners each have a "pot life", defined as the amount of time a specific mass of resin mixture, comprising resin and a respective hardener, remains liquid at a specific temperature. "Pot life" is an objective property by which hardeners may be directly compared. The pot life of the first hardener is preferably longer than the pot life of the second hardener.

The resin mixture may be a thermosetting polymer resin. The resin mixture may be a two-part thermosetting polymer resin. For example, the resin mixture may be a two-part epoxy or polyurethane thermosetting resin.

The supply of resin for the resin mixture may comprise Hexion Epikote (RTM) RIMR135. The supply of hardener may comprise Hexion Epicure (RTM) RIMH137 as the first hardener. The supply of hardener may comprise Hexion Epicure (RTM) RIMH1366 as the second hardener.

The method may further comprise determining an initial mix ratio of the first and second hardeners based upon one or more process parameters. Preferably, the one or more process parameters are one or more of ambient temperature, mould temperature, layup temperature and resin initial temperature.

The method may further comprise mixing the resin predominantly or exclusively with the first hardener at the start of the infusion process. Accordingly, a relatively slow hardener speed may be achieved at the start of the infusion process.

The method may further comprise increasing the speed of the hardener by increasing the proportion of the second hardener in the resin mixture as the infusion process progresses. As such the method may comprise reducing the cure time and/or open time of the resin mixture by increasing the proportion of the second hardener in the resin mixture as the infusion process progresses.

The proportion of the second hardener may be continuously increased or decreased in a gradual process to blend the speed of the hardener in the resin mixture as the infusion process progresses. Alternatively, or additionally, in some examples the proportion of the second hardener may be increased or decreased in a number of discrete stages.

The method may comprise only increasing the proportion of the second hardener in the resin mixture throughout the infusion process to increase the speed of the hardener in the resin mixture from relatively slow, i.e. less reactive at the start of the infusion process, to relatively fast, i.e. more reactive, at the end of the infusion process.

The method preferably comprises maintaining a substantially constant overall ratio of resin to hardener throughout the infusion process whilst the relative proportions of the first and second hardeners are varied. Maintaining a substantially constant overall ratio of resin to hardener ensures that the mechanical properties of the wind turbine component are substantially uniform throughout the wind turbine component.

The method may involve a vacuum assisted resin transfer moulding (VARTM) process. The mould may comprise a substantially rigid main mould part and a second mould part. For example, the second mould part may be a substantially flexible vacuum film. The main mould part may comprise a concave profile in transverse cross section. The layup of fibrous reinforcing material may be supported on the substantially rigid main mould part. The method may comprise arranging the second mould part over the layup supported on the mould. As such, the layup may be sandwiched between the main mould part and the second mould part. The method may comprise sealing the second mould part to the main mould part to define an infusion volume therebetween. The method may comprise evacuating the infusion volume under vacuum pressure.

The mould may comprise a plurality of zones each having a respective resin inlet. The method may further comprise supplying the resin mixture to the layup in a first zone through a first resin inlet. The method may further comprise monitoring the position of the flow front of the resin mixture. The method may further comprise increasing the proportion of the second hardener in the resin mixture as the flow front moves towards a second zone adjacent to the first zone.

The method may comprise monitoring one or more process parameters of the infusion process using a camera located above the mould. For example, the method may comprise monitoring one or more of the temperature and/or position of the resin mixture flow front using a camera located above the mould. The camera is preferably an infra-red camera.

The method may alternatively or additionally comprise monitoring the position of the flow front using mould temperature sensors and/or layup temperature sensors.

In some examples, the method may additionally or alternatively comprise monitoring one or more process parameters of the infusion process using a visible light camera located above the mould. A visible light camera may be advantageous for monitoring the position of the flow front in examples where the resin mixture and layup are a similar or substantially the same temperature, and where an infra-red (thermal-imaging) camera may therefore not differentiate sufficiently between the resin mixture and layup.

In examples where the method comprises arranging a second mould part over the layup for a VARTM process, the second mould part is preferably at least partially translucent or transparent to facilitate monitoring the position of the flow front visually.

When the flow front of the resin mixture reaches the second zone, the method may further comprise reducing the speed of the hardener by reducing the proportion of the second hardener in the resin mixture and supplying the resin mixture to the layup in the second zone through a second resin inlet.

The method may comprise closing the first inlet upon opening the second inlet. The hardener in the resin mixture initially supplied to the second zone through the second inlet is preferably predominantly or exclusively the first hardener. Accordingly, the hardener speed may be relatively slow upon commencing supply to the second zone.

The method may further comprise increasing the proportion of the second hardener in the resin mixture as the flow front moves towards a third zone adjacent to the second zone. As such the method may comprise reducing the cure time and/or open time of the resin mixture by increasing the proportion of the second hardener in the resin mixture as the flow front moves towards the third zone.

The first and/or second hardeners in the resin mixture supplied through the second resin inlet may be different first and/or second hardeners to the first and/or second hardeners in the resin mixture supplied through the first resin inlet.

The method may comprise supplying the resin mixture to the layup in a third mould zone through a third resin inlet. Preferably, the resin mixture supplied to the third mould zone through the third resin inlet initially comprises a mixture of resin and predominantly or exclusively the first hardener. The method may comprise increasing the proportion of the second hardener in the resin mixture as the flow front moves away from the third resin inlet and towards an edge of the layup. As such, the resin mixture supplied through the third resin inlet may comprise a mixture of resin and predominantly or exclusively the second hardener as the flow front approaches the edge of the layup.

The first and/or second hardener in the resin mixture supplied to the layup through the third resin inlet may be different first and/or second hardeners to the first and/or second hardeners in the resin mixture supplied through the first and/or second resin inlet.

The method preferably comprises controlling the speed of the hardener by varying the relative proportions of the first and second hardeners in the resin mixture to ensure that the "open time" of the resin mixture is greater than, or at least equal to, the time taken for the resin mixture to thoroughly infuse the layup in a given zone of the mould. The method may comprise controlling the speed of the hardener by varying the relative proportions of the first and second hardeners in the resin mixture to ensure that resin mixture in a portion of the layup in a given mould zone remains in a liquid or gel phase during infusion of an adjacent portion of the layup in an adjacent mould zone.

The or each resin inlet may be provided in the vacuum film if used. The or each resin inlet may comprise a channel which extends longitudinally in the mould. Resin inlet channels may advantageously facilitate a fast resin infusion by increasing the flow rate of resin mixture infusing the layup in the mould.

The first resin inlet is preferably located in a lowermost portion of the mould. This helps to achieve a square resin mixture flow front, i.e. transverse to the mould, when the resin mixture infuses through the layup. The method preferably comprises initially supplying the resin mixture to the layup through the lowermost resin inlet to ensure that the resin mixture does not flow away from the resin inlet under the influence of gravity, thus facilitating closer control of the infusion process. The first resin inlet is preferably located lower in the mould than the second and third resin inlets. Further, the second resin inlet is preferably located in a lower portion of the mould than the third resin inlet.

The method may further comprise curing the resin mixture in one or more zones whilst simultaneously supplying resin mixture to one or more other zones. The method preferably comprises curing the resin mixture by applying heat to the one or more zones. Alternatively, the method may comprise partially curing the resin mixture in one or more zones whilst simultaneously supplying resin mixture to one or more other zones.

The method may comprise curing or partially curing the resin mixture in one or more zones by applying heat to the mould zone using one or more heating elements. The method may comprise setting the heating element temperature to fully cure the resin mixture in the mould zone. Alternatively, the method may comprise setting the heating element temperature at a lower temperature to partially cure the resin mixture in a mould zone whilst the remainder of the infusion process is ongoing. Partially curing resin mixture infused in the layup in a mould zone allows resin mixture infusing in an adjacent mould zone to chemically link to said partially-cured resin mixture.

When the layup in each mould zone is fully infused, the method preferably comprises fully curing the resin mixture throughout the layup. For example, where the method comprises setting one or more heating elements to partially cure resin mixture in one or more of the mould zones, upon completion of the infusion process, the method preferably comprises setting all of the heating elements to fully cure the resin mixture infused in the layup.

The method may further comprise controlling the infusion process using an artificial intelligence system configured to receive feedback from one or more cameras and/or sensors and to self-optimise settings of the infusion process such as vacuum pressure, resin supply pressure, resin mixture flow rate, hardener mix ratio and curing temperatures.

For example, the method may comprise monitoring the infusion process using a deep learning algorithm to optimise the infusion and curing process, and to optimise one or more stages of the method for future manufacturing processes.

The method may comprise controlling the temperature of the resin mixture. The temperature of the resin mixture may be controlled in dependence on one or more process parameters. As such, the method may comprise heating the resin mixture. For example, the method may comprise heating the resin mixture to a target temperature at which the viscosity of the resin mixture is optimised for the infusion process. The method may comprise controlling the temperature of the resin mixture to substantially correspond to an initial temperature of the layup. For example, the method may comprise providing an input signal to the control system from the layup temperature sensor(s), and may further comprise providing an input signal from the control system to resin heating apparatus to control the temperature of the resin mixture to substantially match the temperature of the layup. In some examples, the method may comprise heating the resin to a target temperature such that, upon mixing with the hardener to create the resin mixture, the temperature of the resin mixture substantially corresponds to the temperature of the layup.

Additionally or alternatively, the method may comprise controlling the temperature of the mould and/or layup to ensure that the resin mixture remains at an optimum viscosity throughout the infusion process. The method may comprise controlling one or more heating elements to provide in-mould control of the resin mixture temperature during the infusion process. In some examples, the method may comprise controlling the temperature of the mould and/or layup to substantially match the temperature of the resin mixture. This may provide an optimised infusion process.

The method may comprise controlling the or each heating element in dependence on one or more process parameters. In some examples, the method may comprise controlling the heating elements in dependence on process parameters such as the resin mixture flow rate, i.e. infusion rate. For example, the method may comprise increasing the temperature of the layup based on the resin mixture flow rate to thereby reduce the viscosity of the resin mixture infused in the layup and increase the infusion rate.

In some examples, the method may comprise supplying a resin mixture to the layup in the third mould zone comprising a hardener composition which on average is faster than a hardener composition comprised in the resin mixture supplied to the layup in the second mould zone. In some examples, the method may comprise supplying a resin mixture to the layup in the second mould zone comprising a hardener composition which on average is faster than a hardener composition comprised in the resin mixture supplied to the layup in the first mould zone.

In some examples, the method may comprise providing one or more further hardeners in addition to the first and second hardener. The method may therefore comprise mixing the resin with one or more of the first, second or additional hardeners to create the resin mixture. A greater number of hardeners may offer a greater range of hardener speeds. Further, a greater number of hardeners may facilitate creating a resin mixture having a greater range of cure times. A greater number of hardeners may also enable more precise control of the hardener speed and/or resin mixture cure time.

In some examples, the method may comprise controlling the cure time and open time of the resin mixture by additionally controlling one or more of the resin mixture temperature, mould temperature, and layup temperature. For example, the method may comprise increasing the temperature of the resin mixture to decrease the cure time of the resin mixture.

In some examples, one or more of the steps in the method may be carried out by a human operator. For example, a human operator may vary the mix ratio of the hardeners in the resin mixture based on one or more process parameters. In some examples, one or more process parameters may be measured by a human operator. For example, a human operator may visually inspect the layup during the infusion process to determine when to vary the hardener mix ratio and/or when to open and close the resin inlets.

In some examples, the method may be controlled by a control system that follows a predefined script without feedback signals from the sensors and/or camera(s). For example, the control system may vary the hardener mix ratio dependent only on process parameters such as elapsed time from the start of the infusion process. Similarly, the control system may control the opening and closing of resin inlets based on process parameters such as elapsed time from the start of the infusion process. As such, once an optimum process has been determined, the same method may be repeatedly carried out by an automated control system without dependence on inputs measuring process parameters such as resin mixture flow front progression and/or resin mixture and layup temperatures.

In a second aspect of the invention there is provided apparatus for making a wind turbine component. The apparatus comprises a mould for supporting a layup of fibrous reinforcing material, a supply of resin, and a supply of hardener comprising at least a first hardener and a second hardener, the second hardener being faster than the first hardener. The apparatus further comprises a resin mixing and supply system for mixing the resin with the first and/or the second hardener to create a resin mixture, and for supplying the resin mixture to the layup during an infusion process. The apparatus further comprises a control system configured to control the speed of the hardener by varying the relative proportions of the first and second hardeners in the resin mixture during the infusion process, based upon one or more process parameters of the infusion process.

The supply of hardener may comprise a hardener metering system arranged to mix the first and second hardener according to a mix ratio determined by the control system, and to supply a defined quantity of the mixed hardener to the resin mixing and supply system. Alternatively, in some examples, the method may comprise separately providing specified amounts of the first and/or second hardener to the resin mixing and supply system in accordance with the mix ratio determined by the control system. As such, the first and second hardener may be mixed simultaneously with mixing the first and/or second hardener with the resin to create the resin mixture.

The apparatus may further include a pump configured to encourage the resin mixture in the resin mixing and supply system to infuse into the layup. The pump may increase the speed of the infusion process by motivating the resin mixture to infuse through the layup at a faster rate than solely relying on vacuum pressure in the infusion volume to draw in the resin mixture. In other examples, the apparatus may not comprise a pump and the vacuum pressure in the layup may be sufficient to draw in the resin mixture at a specified infusion rate.

The apparatus may further comprise one or more sensors for determining one or more process parameters of the infusion process. For example, the apparatus may comprise a temperature sensor for monitoring the ambient temperature during the infusion process. The apparatus may comprise a temperature sensor configured to measure the temperature of the mould. The apparatus may comprise a temperature sensor configured to measure the temperature of the layup. The apparatus may comprise a temperature sensor for monitoring the temperature of the resin mixture.

The mould may comprise a substantially rigid main mould part and a second mould part. The second mould part may be a substantially flexible vacuum film. In some examples where the infusion process is vacuum assisted, the apparatus may comprise pressure sensors configured to monitor the pressure in the infusion volume between the mould surface and the vacuum film.

The apparatus may further comprise a camera arranged above the mould and configured to monitor the temperature and/or flow front position of the resin mixture during the infusion process. Preferably the camera is an infra-red camera. In some examples, the apparatus may comprise a visible light camera located above the mould.

The resin supply system, including resin supply lines, the resin inlets and any resin inlet valves, may also be referred to as a resin inlet manifold. The method preferably comprises automated control of the resin inlet manifold. For example, the method may comprise controlling the resin inlet manifold using the control system in dependence on one or more process parameters.

The apparatus may comprise heating elements configured to help cure the resin mixture infused in the layup. The heating elements are preferably independently controllable, such that each heating element may be activated or deactivated in isolation. The heating elements may be variable-temperature heating elements wherein the temperature of said heating element can be varied continuously within a range of pre-defined temperatures.

The apparatus may comprise a flow meter in the resin mixing and supply system to monitor the resin mixture flow rate to calculate an infusion rate, or speed at which the resin is infusing the layup. The infusion rate may be a process parameter based on which the control system may control one or more stages of the method.

The wind turbine component may be a wind turbine blade.

BRIEF DESCRIPTION OF FIGURES

Embodiments of the present invention will now be described by way of non-limiting example only, with reference to the accompanying figures, in which.

DETAILED DESCRIPTION

Figure 1:
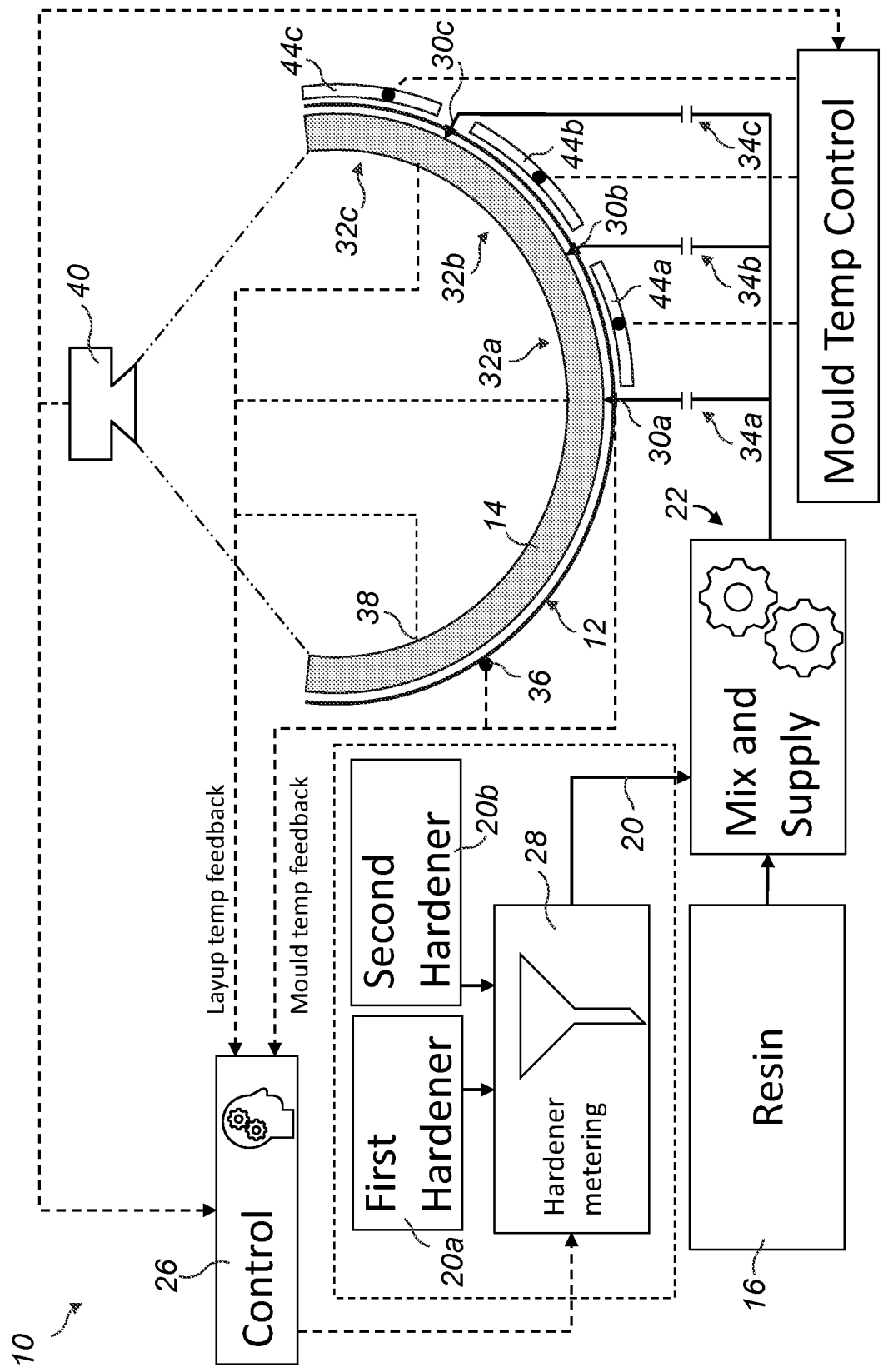
FIG. 1 is a schematic diagram representing apparatus for making a wind turbine component.

The diagram in FIG. 1 schematically represents apparatus 10 for making a wind turbine component. The apparatus 10 comprises a mould 12. In this example the wind turbine component is a shell of a wind turbine blade. As such, the mould 12 is concave in transverse cross section. The mould 12 supports a layup 14 of fibrous reinforcing material, which may comprise reinforcing fibres such as reinforcing glass fibres. The mould 12 may comprise a substantially rigid main mould part on which the layup 14 is supported. In some examples, the mould 12 may additionally comprise a second mould part (not shown) which is arranged over the layup 14. As such, the layup 14 may be sandwiched between the main mould part and a second mould part. In some examples, the second mould part may be a vacuum film.

Referring still to FIG. 1, the apparatus 10 further comprises a supply of resin 16, such as epoxy resin for example. The apparatus 10 also includes a supply of hardener 20. The supply of hardener 20 in this example comprises a first hardener 20a and a second hardener 20b. The apparatus 10 further comprises a resin mixing and supply system 22 configured to mix the resin 16 with the first and/or second hardener 20a, 20b to create a resin mixture 24 (shown in FIGS. 2a to 5). The second hardener 20b may be faster than the first hardener 20a, i.e. the second hardener 20b may be more reactive than the first hardener 20a.

The apparatus 10 comprises a control system 26 configured to vary the relative proportions of the first and second hardener 20a, 20b in the resin mixture 24. The control system 26 is configured to control the speed of the hardener 20 by varying the relative proportions of the first and second hardeners 20a, 20b in the resin mixture 24. As such, the apparatus 10 facilitates control of the cure time and/or open time of the resin mixture 24 by varying the relative proportions of the first and second hardener 20a, 20b in the resin mix 24. For example, mixing the second hardener 20b with the resin 16 may create a resin mixture 24 having a faster cure time and/or open time than a resin mixture 24 comprising only resin 16 and the first hardener 20a.

In some examples, the apparatus 10 comprises a hardener metering system 28 as shown in FIG. 1. The hardener metering system 28 is preferably arranged to mix the first and second hardener 20a, 20b according to a mix ratio determined by the control system 26. As such, the control system 26 may control the speed of the hardener 20 and/or cure rate of the resin mixture 24 by controlling the mix ratio in the hardener metering system 28. The hardener metering system 28 is configured to supply a defined quantity of the mixed hardener 20 to the resin mixing and supply system 22.

The resin mixing and supply system 22 is preferably configured to supply the resin mixture 24 to the layup of fibrous reinforcing material 14 in an infusion process that will be described in more detail later with reference to the remaining figures. To supply the resin mixture 24 to the layup 14, the apparatus 10 may further comprise a plurality of resin inlets 30.

It will be appreciated that the apparatus 10 is only represented schematically in the diagrams in FIGS. 1 to 5. As such it will be understood that, in practice, the apparatus 10 may comprise any number of resin inlets 30. For example, preferably the mould 12 comprises resin inlets 30 on the right side and the left side of the mould 12. Resin inlets 30 are not shown on the left of the mould 12 in the figures solely to simplify the representations in the figures. Further, in practice, the resin inlets 30 are preferably arranged above the layup 14. For example, the resin inlets 30 may be provided in a second mould part, such as a vacuum film (not shown), arranged on top of the layup 14.

The mould 12 may comprise a plurality of mould zones 32a-c. Each of the resin inlets 30 may be associated with one of the mould zones 32. In the example shown in the figures, the mould 12 comprises three adjacent zones 32a-c and three corresponding resin inlets 30a-c. The resin inlets 30a-c may each comprise a corresponding inlet valve 34a-c configured to permit or cut off supply of the resin mixture 24 to the layup 14 through the corresponding resin inlet 30.

The control system 26 is configured to control the speed of the hardener 20 based upon one or more process parameters of the infusion process. As shown in FIG. 1, the apparatus 10 may therefore further comprise sensors for determining process parameters of the infusion process. For example, the apparatus may comprise temperature sensors 36 to measure the temperature of the mould 12. The apparatus 10 may further comprise temperature sensors 38 arranged to measure the temperature of the layup 14. The layup temperature sensors 38 may be provided on, or in, the vacuum film, if used.

Advantageously, the apparatus 10 may additionally comprise visual sensing means 40 such as a camera arranged above the mould 12. The camera 40 may be a visible light camera to monitor the position of the resin mixture flow front 42 (shown in FIGS. 2a to 5) during the infusion process. In some examples, the apparatus 10 may additionally or alternatively comprise an infra-red camera. The infra-red camera may be configured to facilitate monitoring of one or both of the temperature and/or flow front position 42 of the resin mixture 24 during the infusion process in some advantageous examples.

In some examples, the apparatus 10 may comprise heating elements 44 configured to heat the mould 12 and/or to help cure the resin-infused layup 14. The heating elements 44 are preferably arranged in, or beneath, the mould 12 to provide heat to the layup 14. As shown in FIG. 1, in some examples the apparatus 10 may comprise separate heating elements 44a-c corresponding to each mould zone 32a-c. The heating elements 44 are preferably independently controllable, such that each heating element 44 can be activated or deactivated in isolation.

The apparatus 10 facilitates faster infusion and curing of the resin mixture 24 by controlling the speed of the hardener 20 when manufacturing a wind turbine component. As will be described in more detail with reference to the remaining figures, the speed of the hardener 20 is controlled in accordance with the method of the invention by varying the relative proportions of the first and second hardeners 20a, 20b in the resin mixture 24 during the course of the infusion process in dependence upon one or more process parameters.

One example of a method of manufacturing a wind turbine component, such as a wind turbine blade, using the apparatus 10 described above will now be described with reference to the remaining figures.

Figure 2A:
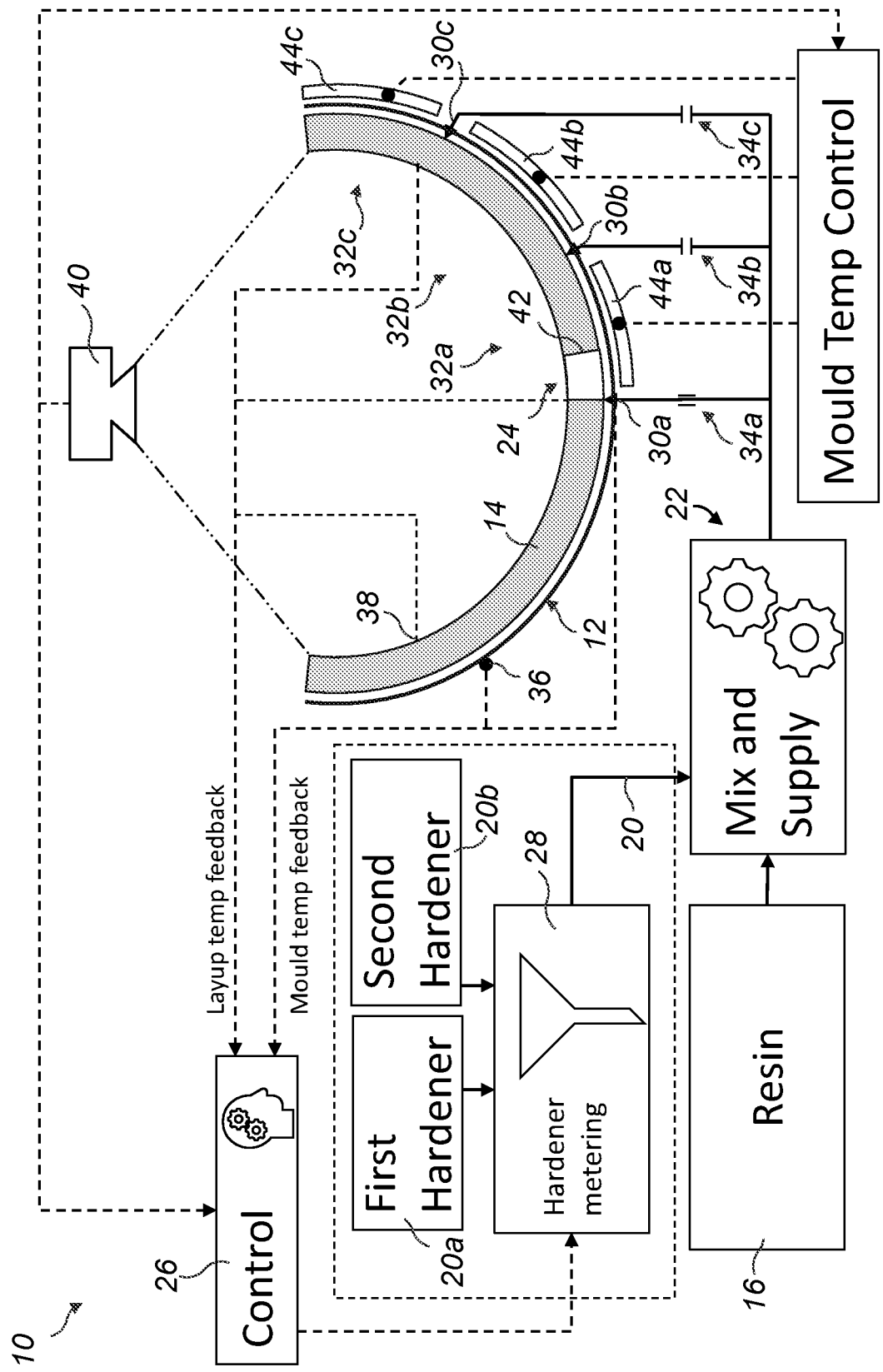
FIGS. 2a to 2c show a resin mixture infusing a layup of fibrous reinforcing material in a first zone of a mould, wherein the composition of the resin mixture varies as the infusion process progresses.

The method initially involves arranging a layup 14 of fibrous reinforcing material on the mould 12. The layup 14 supported in the mould 12 is then infused with the resin mixture 24. As shown in FIG. 2a, the layup 14 in the first mould zone 32a is infused with resin mixture 24 supplied through the first resin inlet 30a. The resin mixture 24 supplied to the layup 14 comprises a mixture of resin 16 and one or more hardeners 20. An initial mix ratio of the first and second hardeners 20a, 20b is determined based upon one or more process parameters. For example, the initial mix ratio may be determined based upon feedback signals provided to the control system 26 by the mould temperature sensors 36 and/or the layup temperature sensors 38. At the start of the infusion process the resin 16 is preferably mixed predominantly or exclusively with the first hardener 20a. As such, the cure time of the resin mixture 24 may be relatively long in an initial stage of the infusion.

Figure 2B:
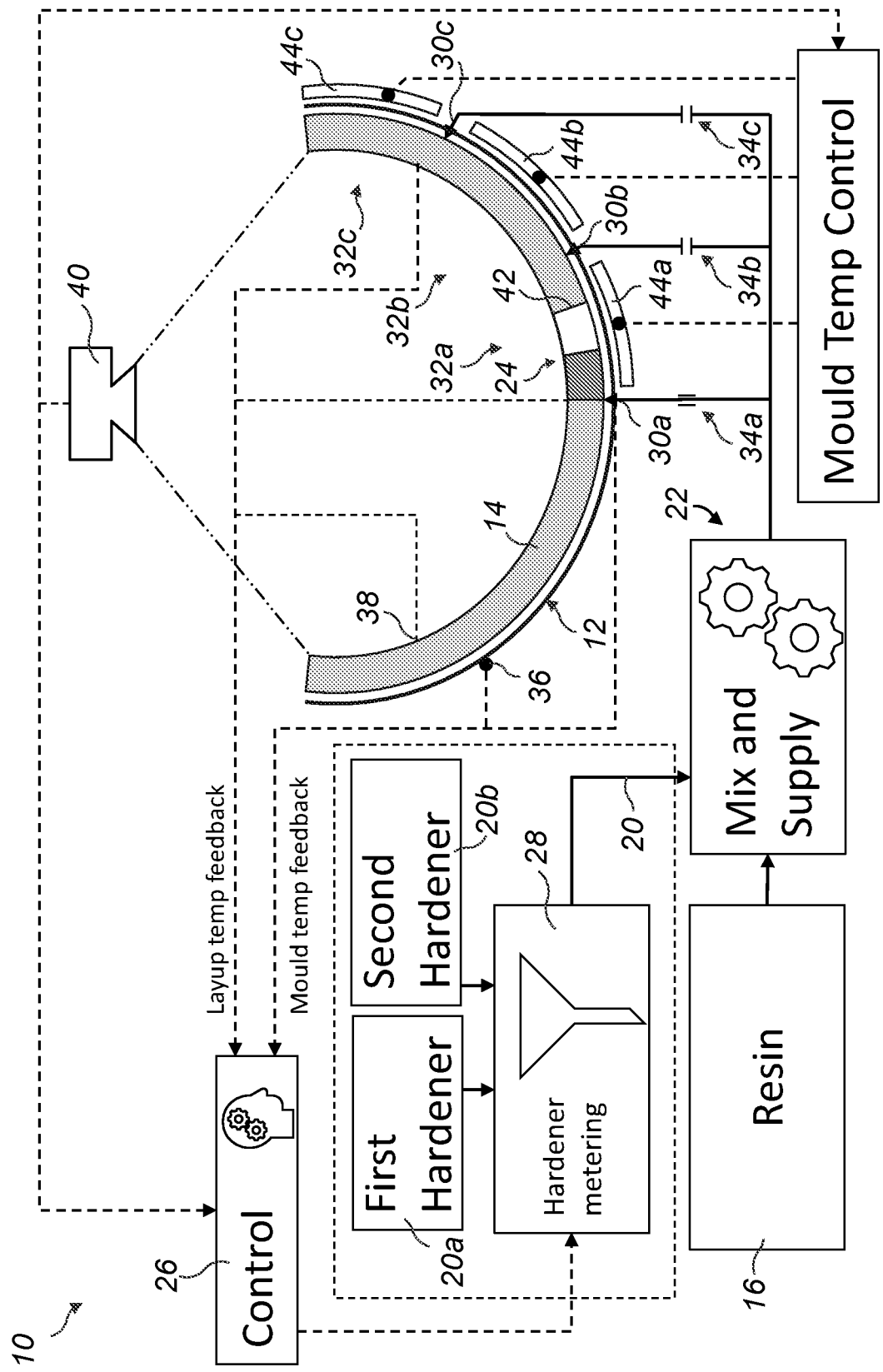

As more resin mixture 24 infuses into the layup 14, the flow front 42 progresses away from the first resin inlet 30a as shown in FIG. 2b. The position of the flow front 42 is monitored, for example by the infra-red camera 40 and/or visible light camera and/or layup temperature sensors 38. As the infusion process progresses, the speed of the hardener 20 is controlled by varying the relative proportions of the first and second hardeners 20a, 20b in the resin mixture 24. The control system 26 may determine a second mix ratio of the hardeners 20a, 20b based upon process parameters such as elapsed time since the start of infusion process and/or position of the resin mixture flow front 42 and/or resin temperature, for example. As the flow front 42 advances towards the second mould zone 32b, the speed of the hardener 20 may be increased by increasing the proportion of the second hardener 20b in the resin mixture 24.

Figure 2C:
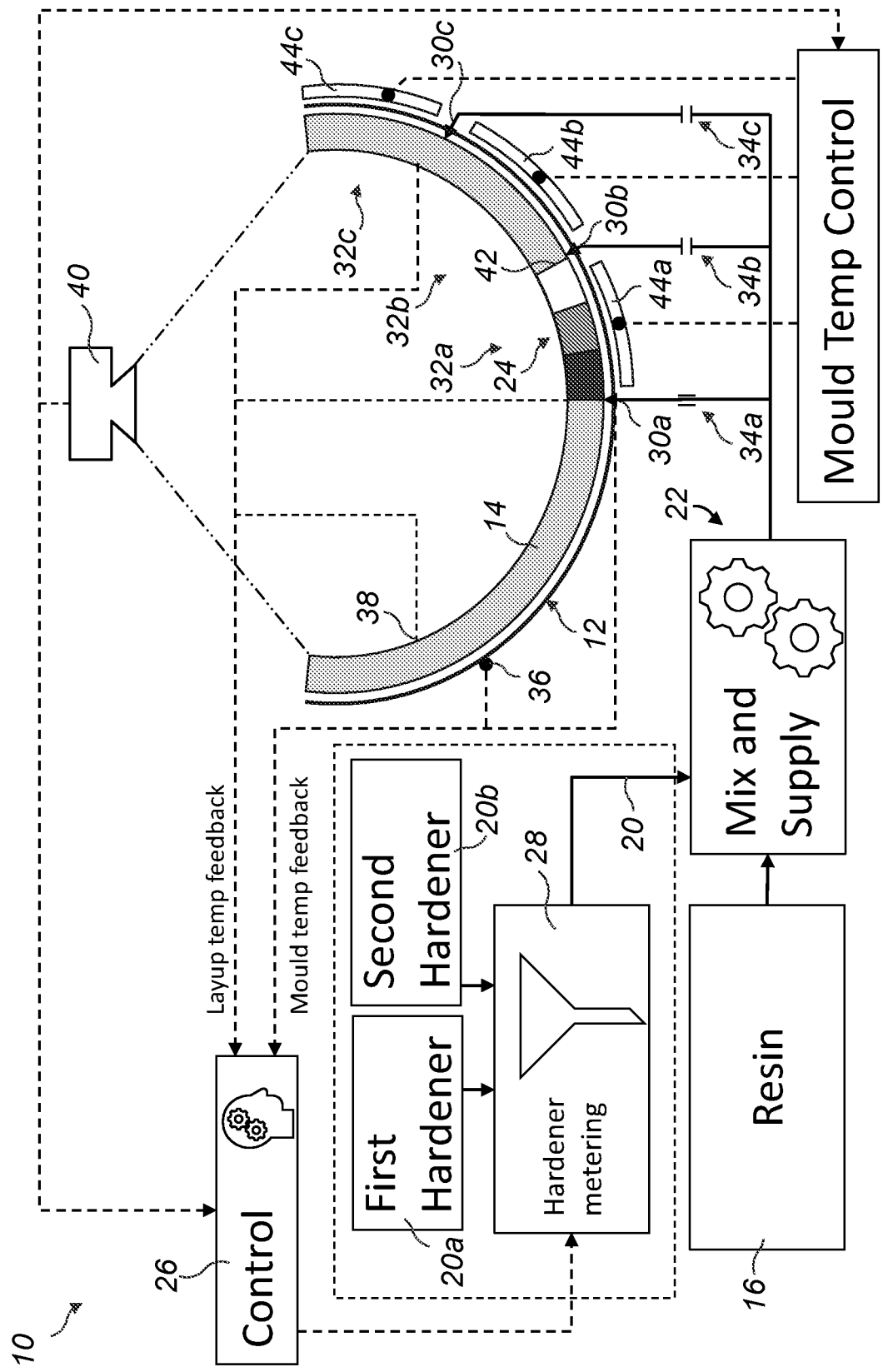

The control system 26 may determine a third mix ratio of the hardeners 20a, 20b as the flow front 42 progresses further still from the first resin inlet 30a as shown in FIG. 2c. The third mix ratio is preferably determined to increase the speed of the hardener 20 further still. As the flow front 42 approaches the second resin inlet 30b, the resin mixture 24 supplied through the first resin inlet 30a may comprise resin 16 mixed predominantly or exclusively with the second (faster) hardener 20b. The speed of the hardener 20 may therefore be increased as the flow front 42 progresses away from the first resin inlet 30a and towards the second resin inlet 30b.

Figure 3A:
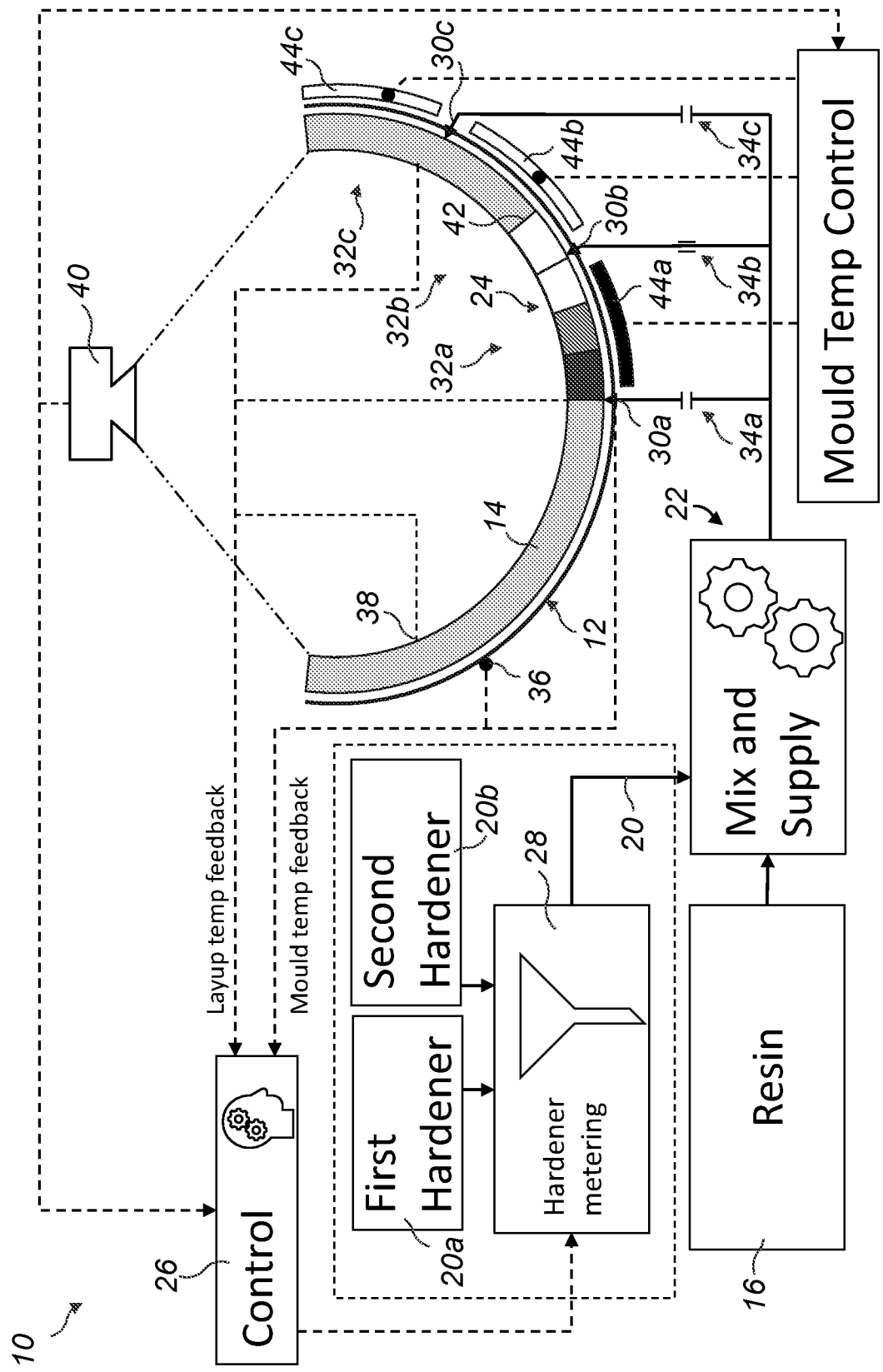
FIGS. 3a to 3c show the resin mixture infusing the layup of fibrous reinforcing material in a second zone of the mould, wherein the composition of the resin mixture varies as the infusion process progresses.

When the layup 14 arranged in the first mould zone 32a is fully infused, i.e. when the resin mixture flow front 42 reaches the portion of the layup 14 arranged in the second mould zone 32b, the method may involve curing, or starting to cure, the resin mixture 24 in the first mould zone 32a. For example, the resin mixture 24 may be cured by applying heat to the first mould zone 32a using a first heating element 44a. The resin mixture 24 infused in the layup 14 in the first mould zone 32a may be cured whilst resin mixture 24 is simultaneously supplied to the second mould zone 32b as shown in FIG. 3a.

Preferably, when the resin mixture flow front 42 reaches the second mould zone 32b, the resin mixture 24 is supplied to the layup 14 through the second resin inlet 30b. As such, the second resin inlet 30b may be opened when the resin mixture flow front 42 reaches the second mould zone 32b. In some examples, as shown in FIG. 3a, the first resin inlet 30a may be closed when the second resin inlet 30b is opened. Closing and opening the resin inlets 30 is synonymous with closing and opening valves 34 in the resin supply system which permit or cut off supply of the resin mixture 24 to the layup 14 through the corresponding resin inlet 30.

Preferably, the resin inlets 30 and/or valves 34 in the resin supply system are controlled by the control system 26. As such, the resin inlets 30 and/or valves 34 are preferably automatically controlled based upon process parameters fed back to the control system 26 from the sensors and/or camera(s) 40. The second resin inlet 30b may therefore be opened, and the first resin inlet 30a may be closed, when one or more of the visual sensing means 40 or layup temperature sensors 38 detect that the resin mixture flow front 42 has reached the second mould zone 32b.

When the resin mixture flow front 42 reaches the second zone 32b, the speed of the hardener 20 may be reduced by reducing the proportion of the second hardener 20b in the resin mixture 24. The mix ratio of first and second hardeners 20a, 20b is preferably determined based upon one or more process parameters. The resin mixture 24 supplied to the second mould zone 32b through the second resin inlet 30b preferably comprises resin 16 mixed predominantly or exclusively with the first hardener 20a. Accordingly, the hardener speed may be relatively slow upon commencing supply to the second zone 32b.

Figure 3B:
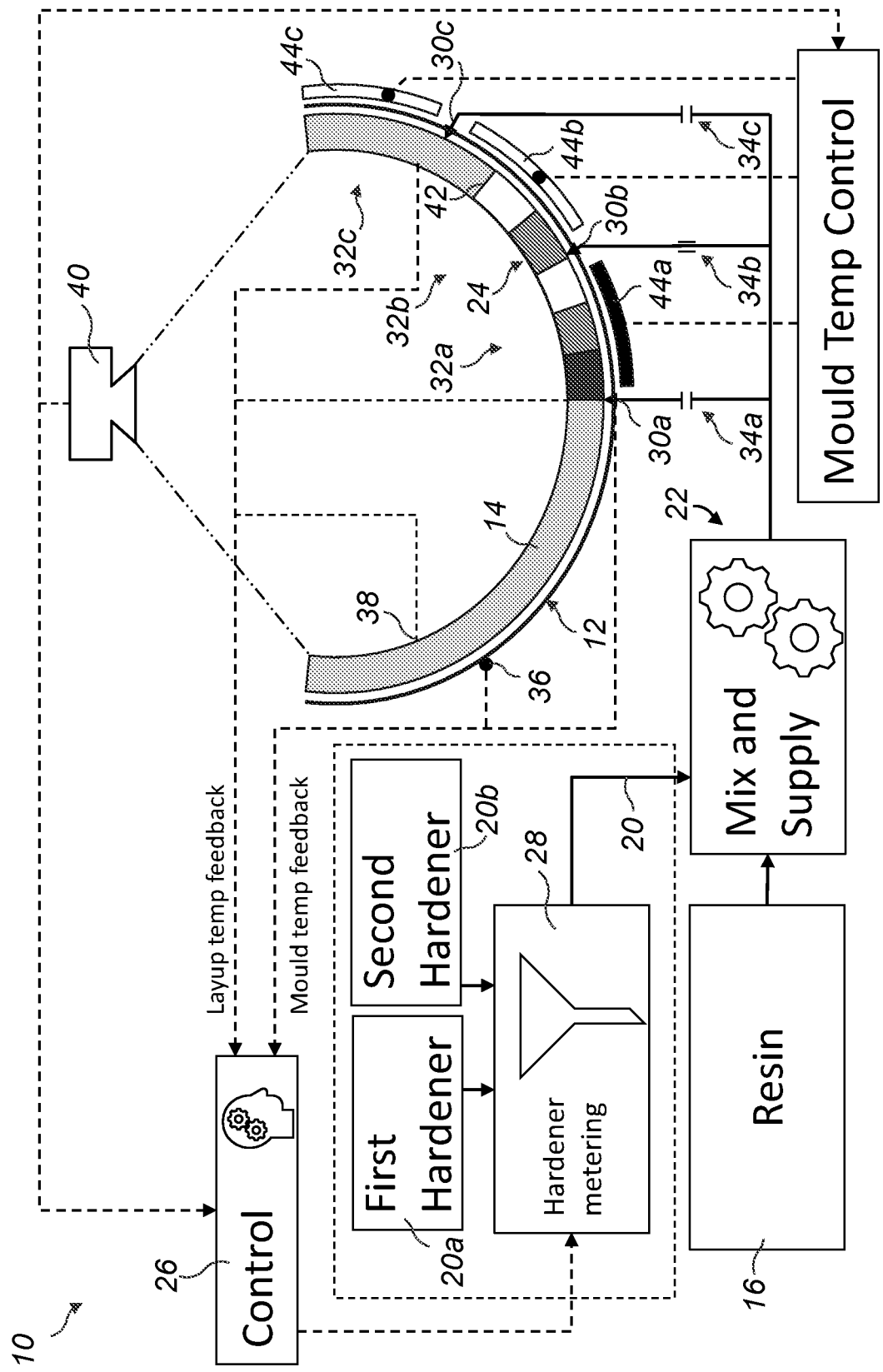
Figure 3C:
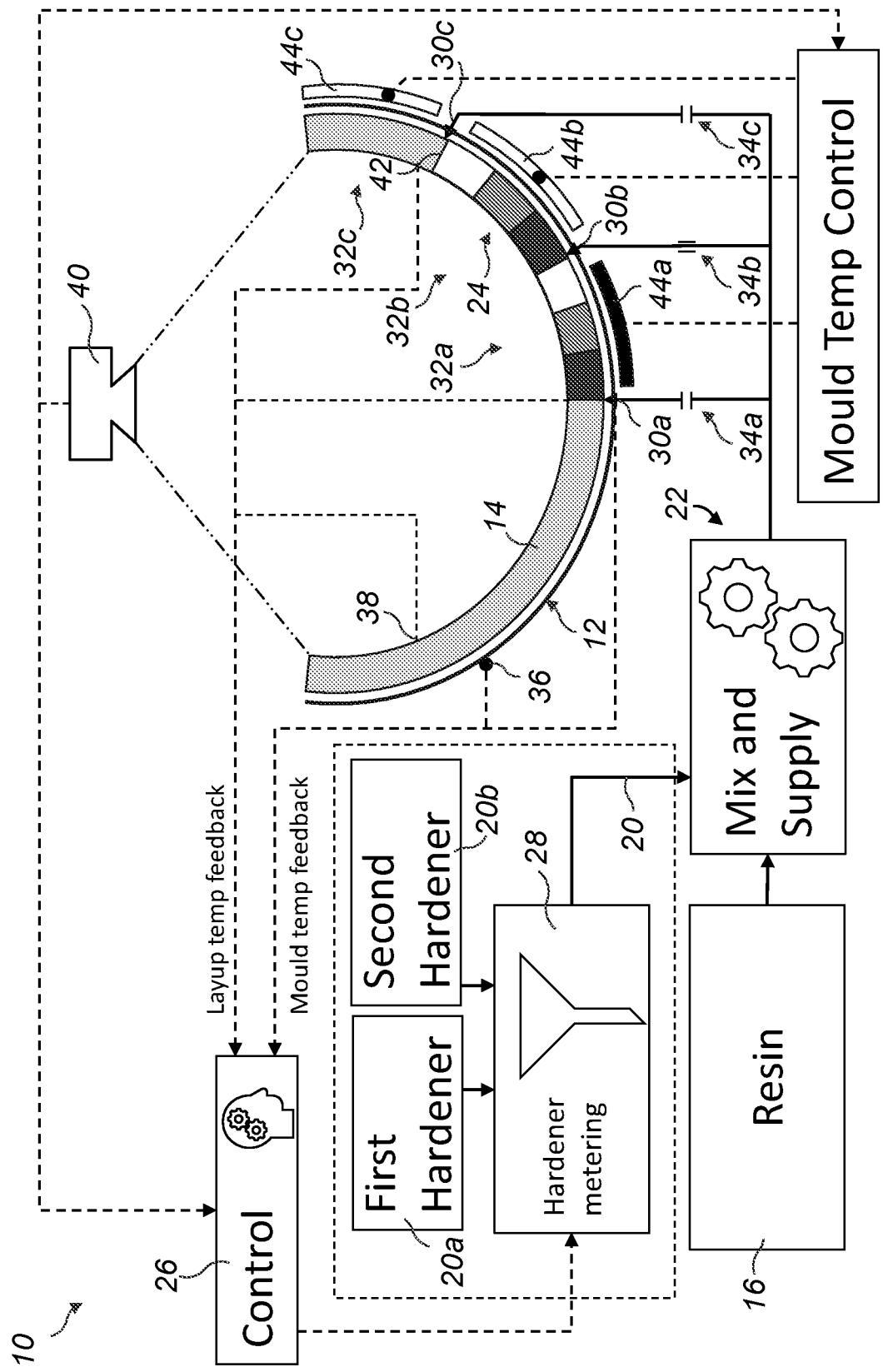

FIGS. 3b and 3c show further stages in the infusion process where the resin mixture flow front 42 progresses away from the second resin inlet 30b. As more resin mixture 24 infuses the layup 14 in the second mould zone 32b, the flow front 42 moves towards the layup 14 in the third mould zone 32c. As the flow front 42 advances towards the third mould zone 32c, the proportion of the second hardener 20b in the resin mixture 24 may be increased, thereby increasing the speed of the hardener 20. As such, the cure time of the resin mixture 24 being supplied to the second mould zone 32b may be shortened, i.e. get faster, as the flow front 42 progresses towards the third mould zone 32c. As the flow front 42 approaches the third resin inlet 30c, the resin mixture 24 being supplied through the second resin inlet 30b may comprise resin 16 mixed predominantly or exclusively with the second (faster) hardener 20b. The speed of the hardener 20 may therefore be increased as the flow front 42 progresses away from the second resin inlet 30b and towards the third resin inlet 30c.

Figure 4A:
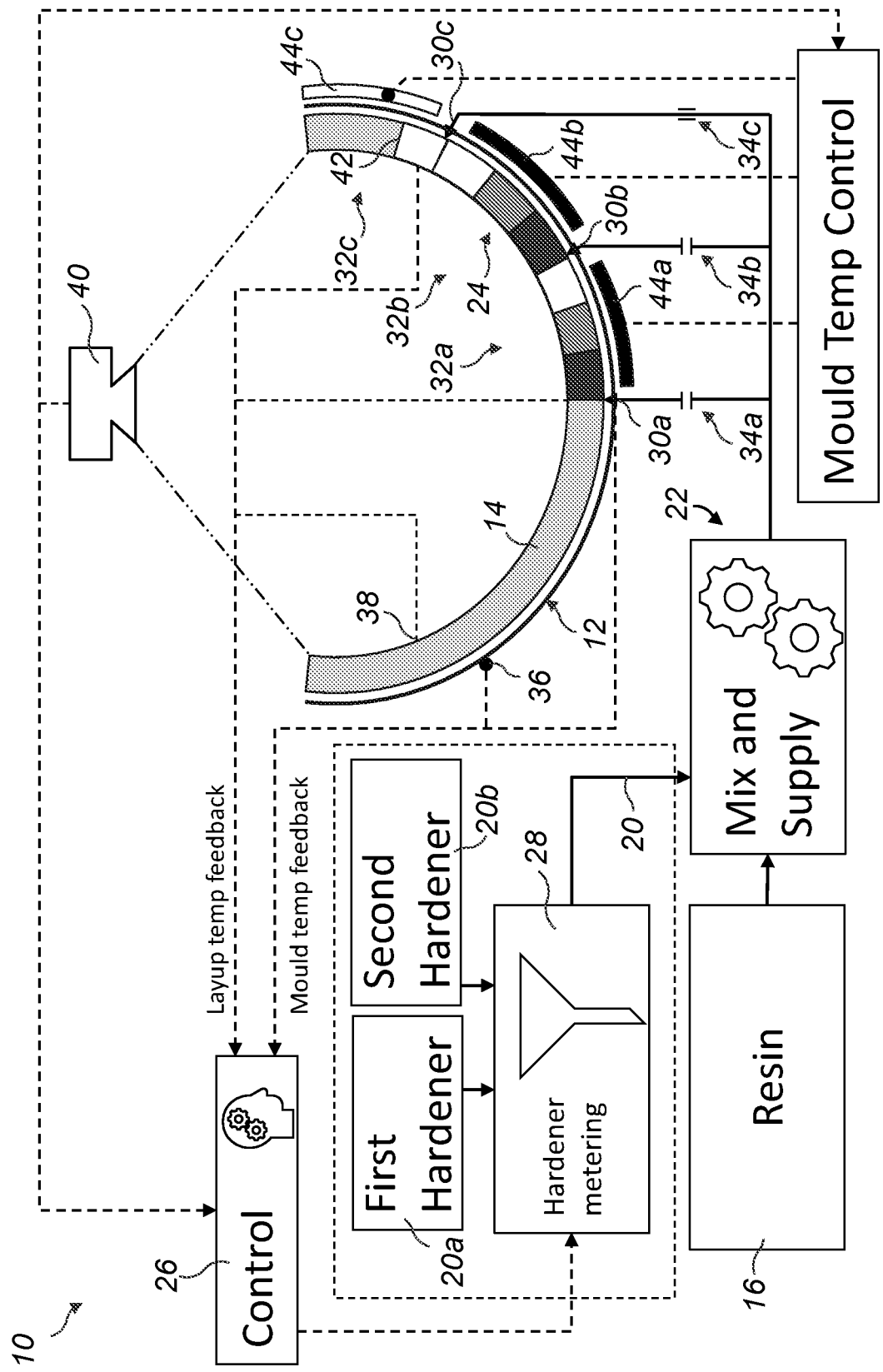
FIGS. 4a to 4c show the resin mixture infusing the layup of fibrous reinforcing material in a third zone of the mould, wherein the composition of the resin mixture varies as the infusion process progresses.
Figure 4B:
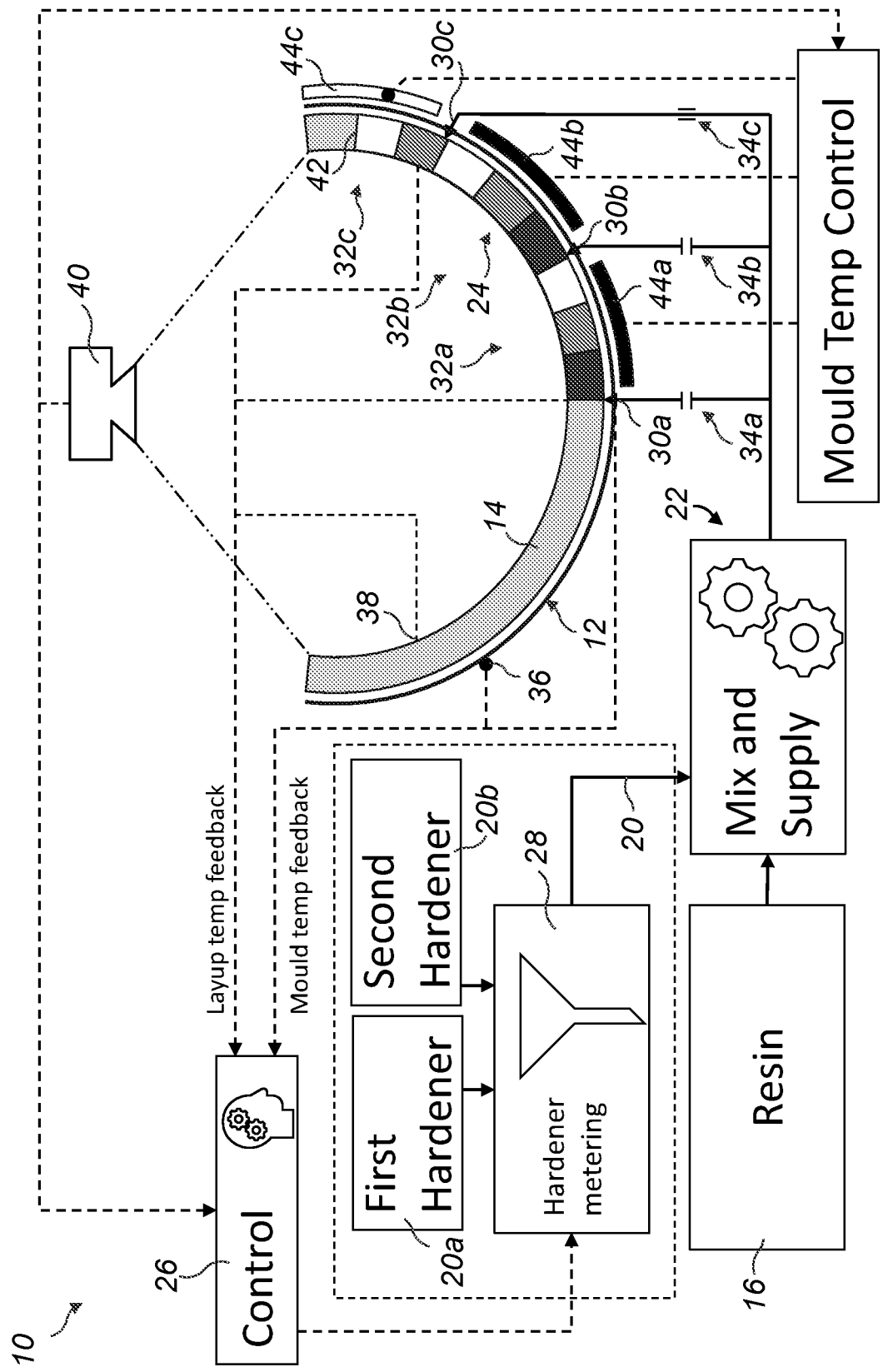
Figure 4C:
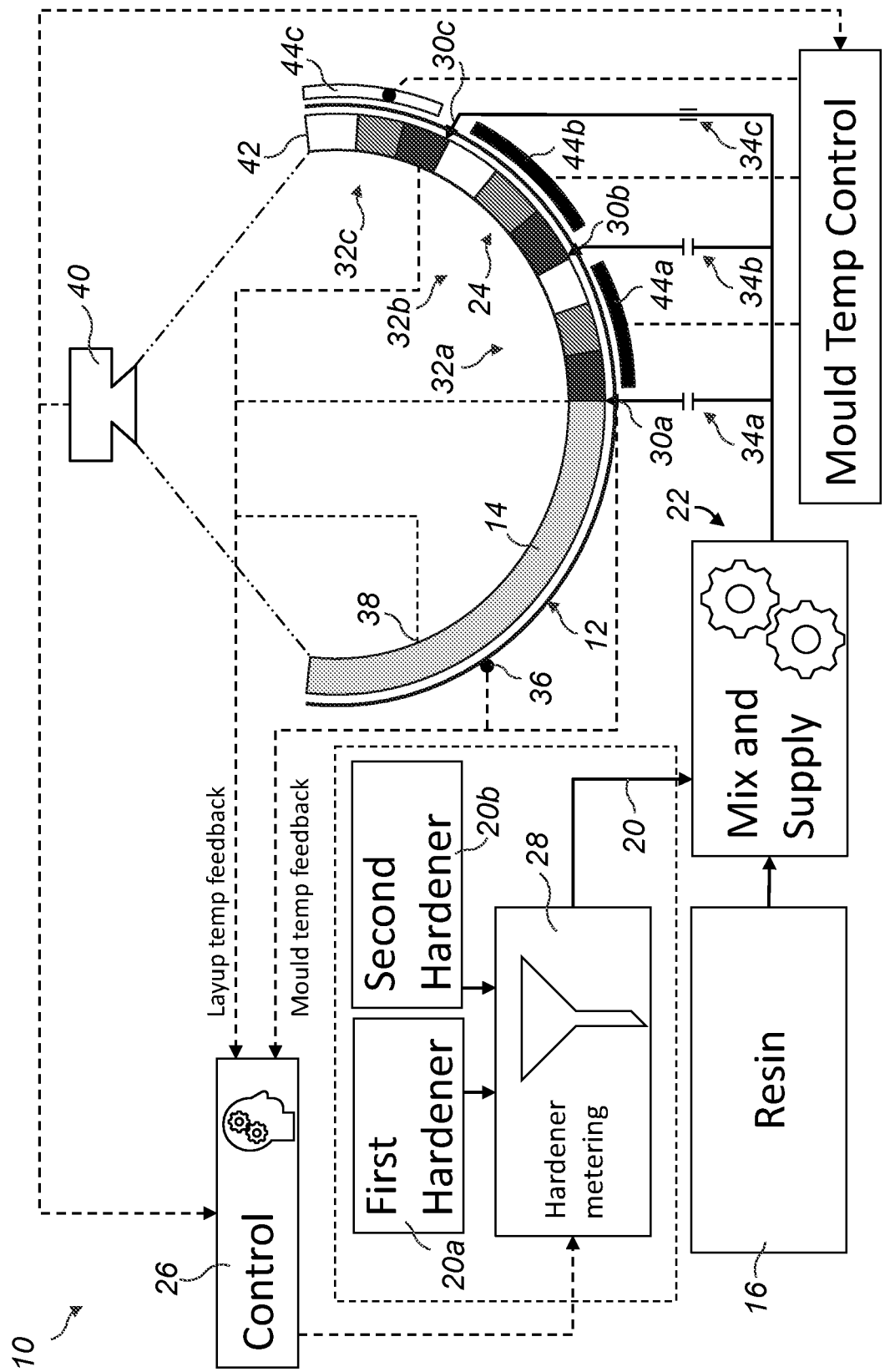

FIGS. 4a to 4c show further stages in the infusion process where the resin mixture 24 is supplied to the layup 14 in the third mould zone 32c. Whilst the resin mixture 24 is supplied to the third mould zone 32c, the method may involve curing or partially curing the resin mixture 24 infused in the layup 14 in the second mould zone 32b. For example, the resin mixture 24 in the second mould zone 32b may be cured by applying heat to the second mould zone 32b using a second heating element 44b.

The resin mixture 24 may be supplied to the layup 14 in the third mould zone 32c through the third resin inlet 30c. In some examples, as shown in FIG. 4a, the second resin inlet 30b may be closed when the third resin inlet 30c is opened. When the resin mixture flow front 42 reaches the third mould zone 32c, the speed of the hardener 20 in the resin mixture 24 may be reduced. For example, the proportion of the second hardener 20b in the resin mixture 24 may be reduced. Preferably, the resin mixture 24 initially supplied to the third mould zone 32c through the third resin inlet 30b comprises a mixture of resin 16 and predominantly or exclusively the first hardener 20a.

The resin mixture flow front 42 progresses through the layup 14 in the third mould zone 32c and away from the third resin inlet 30c. As the infusion process progresses in the third mould zone 32c, the speed of the hardener 20 in the resin mixture 24 may be increased. For example, based on signals input to the control system 26 from the temperature sensors 36, 38 and/or cameras 40 monitoring the progress of the flow front 42, the control system 26 may increase the proportion of the second hardener 20b in the resin mixture 24. As the flow front 42 approaches the edge of the layup 14, and the infusion process nears completion, the resin mixture 24 supplied through the third resin inlet 30c may comprise a mixture of resin 16 and predominantly or exclusively the second hardener 20b.

Figure 5:
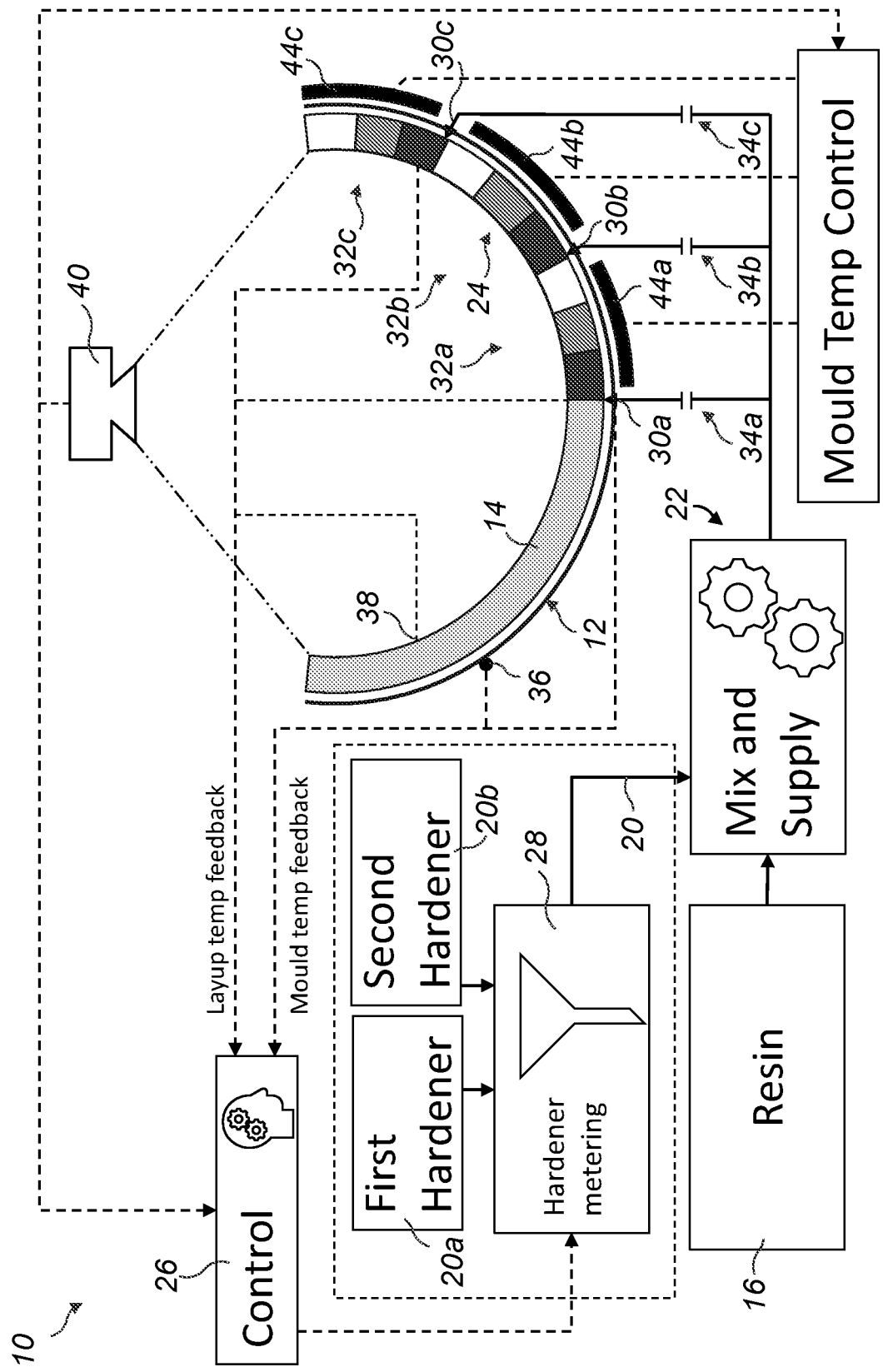
FIG. 5 shows a curing stage in the method for making a wind turbine component wherein the resin-infused layup in each zone is cured to form the wind turbine component.

Following completion of the infusion process, i.e. when the layup 14 in each of the mould zones 32a-c is thoroughly infused with resin mixture 24 as shown in FIG. 5, the heating elements 44 are preferably all set to cure the resin-infused layup 14.

Each production run is preferably recorded and analysed by an artificial intelligence system, such as a machine-learning system or a deep-learning system for example. The artificial intelligence system is preferably configured to receive feedback signals from the camera(s) 40 and/or any sensors comprised in the apparatus 10. For example, the artificial intelligence system may be integrated with the control system 26. In preferred examples, the artificial intelligence system receives data inputs from the sensors and/or cameras 40 and/or process logs of the infusion process to self-optimise the resin infusion and curing process. For example, optimising the infusion process may involve optimising settings such as vacuum pressure, mould temperature, resin supply pressure, resin mixture flow rate, resin temperature, hardener selection, hardener mix ratio, resin mixture curing temperatures, resin mixture cure rate, resin inlet opening and closing conditions and resin inlet control sequences for example. As such, the manufacturing process can be continuously optimised with each production run using the above-described method and apparatus 10.

The manufacturing method described above is preferably a substantially automated process. For example, the infusion process may be controlled by an artificial intelligence system configured to receive feedback from one or more cameras 40 and/or sensors 36, 38 of the apparatus 10, and based on said feedback, to control one or more process parameters of the infusion and curing process. For example, following manual arrangement of the fibrous reinforcing material in the mould 12, and arrangement of a second mould part if used, substantially the whole infusion and curing process may be automated and completed without further human input. The control system 26, preferably controlled by an artificial intelligence system, may control process parameters such as vacuum pressure, initial resin temperature, mould temperature, resin supply pressure, resin mixture flow rate, hardener mix ratio, resin inlet control sequences (opening and closing) and heating element control for example.

In the examples described herein with reference to the accompanying figures, the hardener 20 supplied to the resin mixing and supply system 22 is pre-mixed, i.e. the hardener 20 supplied to the resin mixing and supply system 22 comprises relative proportions of the first and/or second hardener 20a, 20b in accordance with the mix ratio determined by the control system 26. However, in some examples, the method may comprise separately providing specified amounts of the first and/or second hardener 20a, 20b to the resin mixing and supply system 22 in accordance with the mix ratio determined by the control system 26. As such, the first and second hardener 20a, 20b may be mixed together simultaneously with mixing the first and/or second hardener 20a, 20b with the resin 16 to create the resin mixture 24.

In the examples described above, the supply of hardener 20 comprises at least a first and second hardener 20a, 20b. However, in some examples, the method may comprise providing one or more further hardeners in addition to the first and second hardener 20a, 20b. The method may therefore comprise mixing the resin 16 with one or more of the first, second or additional hardeners to create the resin mixture 24.

Many modifications may be made to the examples described above without departing from the scope of the present invention as defined in the accompanying claims. It will be appreciated that features described in relation to each of the examples above may be readily combined with features described with reference to any other examples described herein without departing from the scope of the invention as defined by the following claims.

The invention claimed is:

1. A method of making a wind turbine component, the method comprising:
   supporting a layup of fibrous reinforcing material in a wind turbine component mould;
   providing a supply of resin);
   providing a supply of hardener comprising at least a first hardener and a second hardener, the second hardener being faster than the first hardener;
   mixing resin with the first and/or second hardener to create a resin mixture;
   supplying the resin mixture to the layup during an infusion process;
   monitoring one or more process parameters of the infusion process; and
   controlling the speed of the hardener by varying the relative proportions of the first and second hardeners in the resin mixture during the course of the infusion process in dependence upon the one or more process parameters.

2. The method of claim 1, wherein the one or more process parameters are selected from the group comprising: ambient temperature, resin mixture temperature, elapsed time since start of infusion process, position of a resin mixture flow front and a vacuum pressure in the mould.

3. The method of claim 1, further comprising determining an initial mix ratio of the first and second hardeners based upon one or more process parameters.

4. The method of claim 3, wherein the one or more process parameters include one or more of ambient temperature, mould temperature, layup temperature and resin initial temperature.

5. The method of claim 1, further comprising mixing the resin predominantly or exclusively with the first hardener at the start of the infusion process.

6. The method of claim 1, further comprising increasing the speed of the hardener by increasing the proportion of the second hardener in the resin mixture as the infusion process progresses.

7. The method of claim 1, wherein the mould comprises a plurality of zones each having a respective resin inlet, and wherein the method further comprises:
   supplying the resin mixture to the layup in a first zone through a first resin inlet;
   monitoring the position of a flow front of the resin mixture; and
   increasing the proportion of the second hardener in the resin mixture as the flow front moves towards a second zone adjacent to the first zone.

8. The method of claim 7, wherein when the flow front of the resin mixture reaches the second zone, the method further comprises:
   reducing the speed of the hardener by reducing the proportion of the second hardener in the resin mixture; and
   supplying the resin mixture to the layup in the second zone through a second resin inlet.

9. The method of claim 8, further comprising increasing the proportion of the second hardener in the resin mixture as the flow front moves towards a third zone adjacent to the second zone.

10. The method of claim 7, further comprising curing the resin mixture in one or more zones.

11. The method of claim 10, further comprising curing the resin mixture in one or more zones by applying heat to said one or more zones, whilst simultaneously supplying resin mixture to one or more other zones.

12. The method of claim 1, further comprising controlling the infusion process using an artificial intelligence system configured to receive feedback from one or more cameras and/or sensors and to self-optimise settings of the infusion process.

13. The method of claim 12, wherein self-optimising settings of the infusion process include self-optimising one or more of vacuum pressure, resin supply pressure, resin mixture flow rate, hardener mix ratio and curing temperatures.

14. The method of claim 1, wherein monitoring one or more process parameters of the infusion process includes monitoring one or more of temperature and/or position of a resin mixture flow front using a camera located above the mould.

15. An apparatus for making a wind turbine component, the apparatus comprising:
- a wind turbine component mould for supporting a layup of fibrous reinforcing material;
- a supply of resin;
- a supply of hardener comprising at least a first hardener and a second hardener, the second hardener being faster than the first hardener;
- a resin mixing and supply system for mixing the resin with the first and/or the second hardener to create a resin mixture, and for supplying the resin mixture to the layup during an infusion process;
- one or more sensors for determining one or more process parameters of the infusion process; and
- a control system configured to control the speed of the hardener by varying the relative proportions of the first and second hardeners in the resin mixture during the infusion process, based upon the one or more process parameters of the infusion process.

16. The apparatus of claim 15, wherein the supply of hardener comprises a hardener metering system arranged to mix the first and second hardener according to a mix ratio determined by the control system, and to supply a defined quantity of the mixed hardener to the resin mixing and supply system.

17. The apparatus of claim 15, wherein the one or more sensors includes a camera arranged above the mould and configured to monitor the temperature and/or flow front of the resin mixture during the infusion process.

18. The apparatus of claim 17, wherein the camera is an infra-red camera.

* * * * *